(12) United States Patent
Knarr et al.

(10) Patent No.: US 11,948,237 B2
(45) Date of Patent: Apr. 2, 2024

(54) SYSTEM AND METHOD FOR MIMICKING USER HANDWRITING OR OTHER USER INPUT USING AN AVATAR

(71) Applicant: Samsung Electronics Co., Ltd., Suwon-si (KR)

(72) Inventors: Duncan D. Knarr, Santa Rosa, CA (US); Siva Penke, San Jose, CA (US); Svetlana P. Gurenkova, San Carlos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/752,602

(22) Filed: May 24, 2022

(65) Prior Publication Data

US 2023/0215069 A1 Jul. 6, 2023

Related U.S. Application Data

(60) Provisional application No. 63/295,048, filed on Dec. 30, 2021.

(51) Int. Cl.
| | | |
|---|---|---|
| G06T 13/40 | (2011.01) | |
| G06F 3/01 | (2006.01) | |
| G06T 11/20 | (2006.01) | |
| G06T 13/80 | (2011.01) | |
| G06V 30/32 | (2022.01) | |

(52) U.S. Cl.
CPC .............. *G06T 13/40* (2013.01); *G06F 3/011* (2013.01); *G06T 11/203* (2013.01); *G06T 13/80* (2013.01); *G06V 30/347* (2022.01)

(58) Field of Classification Search
None
See application file for complete search history.

(56) References Cited

U.S. PATENT DOCUMENTS

| | | |
|---|---|---|
| 8,451,278 B2 | 5/2013 | Geisner et al. |
| 9,633,463 B2 | 4/2017 | Li et al. |
| 9,706,040 B2 | 7/2017 | Kadirvel et al. |
| | (Continued) | |

FOREIGN PATENT DOCUMENTS

| | | | |
|---|---|---|---|
| JP | 2020-052775 A | 4/2020 | |
| JP | 6974253 B2 | 12/2021 | |
| | (Continued) | | |

OTHER PUBLICATIONS

Reddit, "How does flipping the video remove copyright", 2015.*
(Continued)

*Primary Examiner* — Jeffrey J Chow

(57) ABSTRACT

A method includes obtaining input information defining a user input associated with a user of a first electronic device at a second electronic device. The method also includes presenting, on a display screen of the second electronic device, an avatar. The method further includes causing, using at least one processor of the second electronic device, the avatar on the display screen of the second electronic device to draw the user input on the display screen of the second electronic device. The avatar has associated dimensions within an avatar space, and a first draw path used by the avatar to draw the user input is normalized based on the dimensions of the avatar within the avatar space.

29 Claims, 8 Drawing Sheets

(56) References Cited

U.S. PATENT DOCUMENTS

| | | | |
|---|---|---|---|
| 10,943,382 B2 | 3/2021 | Shapiro et al. | |
| 11,023,036 B1 | 6/2021 | Atlas et al. | |
| 2011/0045907 A1 | 2/2011 | Villa et al. | |
| 2011/0099476 A1 | 4/2011 | Snook et al. | |
| 2012/0019517 A1* | 1/2012 | Corazza | G06T 17/20 |
| | | | 345/419 |
| 2015/0338924 A1* | 11/2015 | Watanabe | H04N 23/61 |
| | | | 345/156 |
| 2016/0147307 A1* | 5/2016 | Masuko | G06F 40/129 |
| | | | 715/863 |
| 2016/0203362 A1* | 7/2016 | Huang | G06F 21/32 |
| | | | 726/19 |
| 2016/0267699 A1 | 9/2016 | Borke et al. | |
| 2016/0300388 A1* | 10/2016 | Stafford | A63F 13/69 |
| 2017/0371432 A1* | 12/2017 | Gavriliuc | G06F 3/0304 |
| 2020/0014792 A1 | 1/2020 | Lyren et al. | |
| 2020/0234509 A1 | 7/2020 | Yan et al. | |
| 2021/0056251 A1* | 2/2021 | Parmar | G06F 3/04847 |
| 2021/0118232 A1* | 4/2021 | Scott, II | G06V 40/28 |
| 2021/0349529 A1* | 11/2021 | Winold | A61B 5/1124 |
| 2022/0172418 A1* | 6/2022 | Zhang | G06T 13/40 |
| 2023/0131109 A1 | 4/2023 | Meier et al. | |

FOREIGN PATENT DOCUMENTS

| | | |
|---|---|---|
| JP | 7326805 B2 | 8/2023 |
| KR | 10-2021-0024984 A | 3/2021 |

OTHER PUBLICATIONS

Barrientos et al., "cursive Controlling Expressive Avatar Gesture Using Pen Gesture", Oct. 2002.*

International Search Report and Written Opinion of the International Searching Authority dated Feb. 23, 2023 in connection with International Patent Application No. PCT/KR2022/017938, 10 pages.

* cited by examiner

SYSTEM AND METHOD FOR MIMICKING USER HANDWRITING OR OTHER USER INPUT USING AN AVATAR

CROSS-REFERENCE TO RELATED APPLICATION AND PRIORITY CLAIM

This application claims priority under 35 U.S.C. § 119(e) to U.S. Provisional Patent Application No. 63/295,048 filed on Dec. 30, 2021, which is hereby incorporated by reference in its entirety.

TECHNICAL FIELD

This disclosure relates generally to user interface systems. More specifically, this disclosure relates to a system and method for mimicking user handwriting or other user input using an avatar.

BACKGROUND

Electronic devices are routinely incorporating virtual digital assistants that can interact with users. For example, many mobile smartphones, tablet computers, and other electronic devices include applications that can display virtual digital assistants in the form of avatars to the users. These avatars are often animated so that they appear to talk with the users of the electronic devices. In many cases, the avatars can be customized, such as by the users of the electronic devices, in order to change the appearances of the avatars.

SUMMARY

This disclosure relates to a system and method for mimicking user handwriting or other user input using an avatar.

In a first embodiment, a method includes obtaining input information defining a user input associated with a user of a first electronic device at a second electronic device. The method also includes presenting, on a display screen of the second electronic device, an avatar. The method further includes causing, using at least one processor of the second electronic device, the avatar on the display screen of the second electronic device to draw the user input on the display screen of the second electronic device. The avatar has associated dimensions within an avatar space, and a first draw path used by the avatar to draw the user input is normalized based on the dimensions of the avatar within the avatar space.

In a second embodiment, an apparatus includes a display screen and at least one processing device. The at least one processing device is configured to obtain input information defining a user input associated with a user of an electronic device, initiate presentation of an avatar on the display screen, and cause the avatar on the display screen to draw the user input on the display screen. The avatar has associated dimensions within an avatar space, and a first draw path used by the avatar to draw the user input is normalized based on the dimensions of the avatar within the avatar space.

In a third embodiment, a non-transitory computer readable medium contains instructions that when executed cause at least one processor to obtain input information defining a user input associated with a user of an electronic device, initiate presentation of an avatar on a display screen, and cause the avatar on the display screen to draw the user input on the display screen. The avatar has associated dimensions within an avatar space, and a first draw path used by the avatar to draw the user input is normalized based on the dimensions of the avatar within the avatar space.

In a fourth embodiment, a method includes obtaining, using at least one processor of a first electronic device, first information defining a user input from a user of the first electronic device. The method also includes determining, using the at least one processor of the first electronic device, how to cause an avatar to move based on the first information. The method further includes transmitting, to a second electronic device, second information defining movements of the avatar that, when displayed on the second electronic device, cause the avatar to draw the user input on a display screen of the second electronic device. The avatar has associated dimensions within an avatar space, and the second information defines the movements of the avatar as following a first draw path. The first draw path is normalized based on the dimensions of the avatar within the avatar space.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
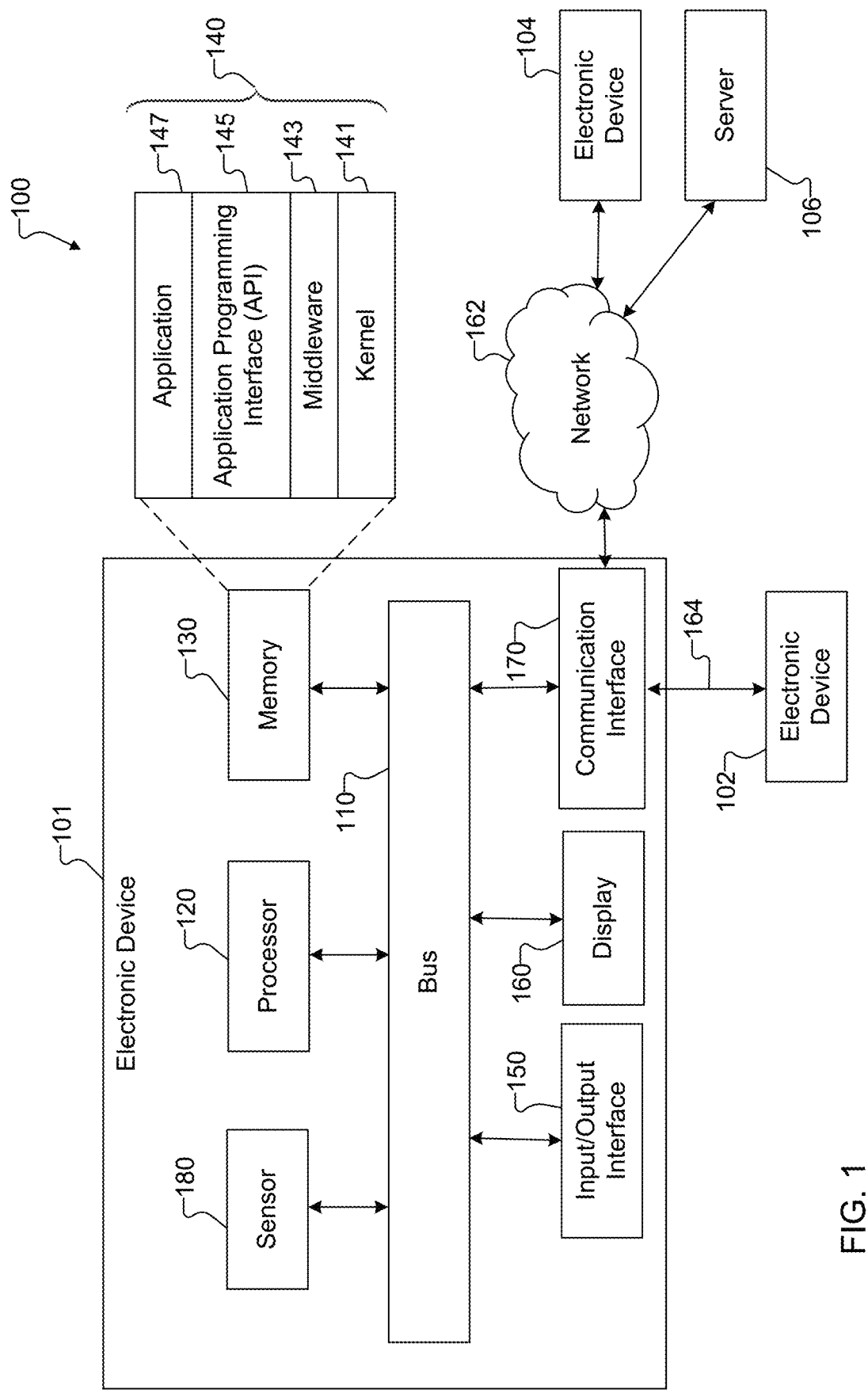
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, electronic devices are routinely incorporating virtual digital assistants that can interact with users. For example, many mobile smartphones, tablet computers, and other electronic devices include applications that can display virtual digital assistants in the form of avatars to the users. These avatars are often animated so that they appear to talk with the users of the electronic devices. In many cases, the avatars can be customized, such as by the users of the electronic devices, in order to change the appearances of the avatars.

This disclosure provides techniques for using avatars to mimic user handwriting, user drawings, or other user-provided inputs. As described in more detail below, user input can be received at a first device, and an avatar can be displayed on a second device and used to draw the user input on a display screen of the second device. This provides a unique way for allowing users of the devices to interact with one another. Moreover, the avatar can be controlled so that the drawing of the user input by the avatar looks more realistic, such as by controlling the movements of the avatar so that a moving portion of the avatar does not pass through another portion of the avatar.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). In some cases, the processor 120 can receive and process user input, and the user input or information associated with the user input can be provided to another electronic device so that an avatar can be displayed by the other electronic device and can draw the user input. In other cases, the processor 120 can receive user input or information associated with the user input, initiate display of an avatar, and cause the avatar to draw the user input.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting avatar-based exchange of information, such as one or more applications for receiving and processing user input or one or more applications for displaying an avatar and causing the avatar to draw user input. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can support avatar-based exchange of information between electronic devices, such as by receiving user input or information associated with user input from one device and providing the user input or the information associated with the user input (with or without processing by the server 106) to another device.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
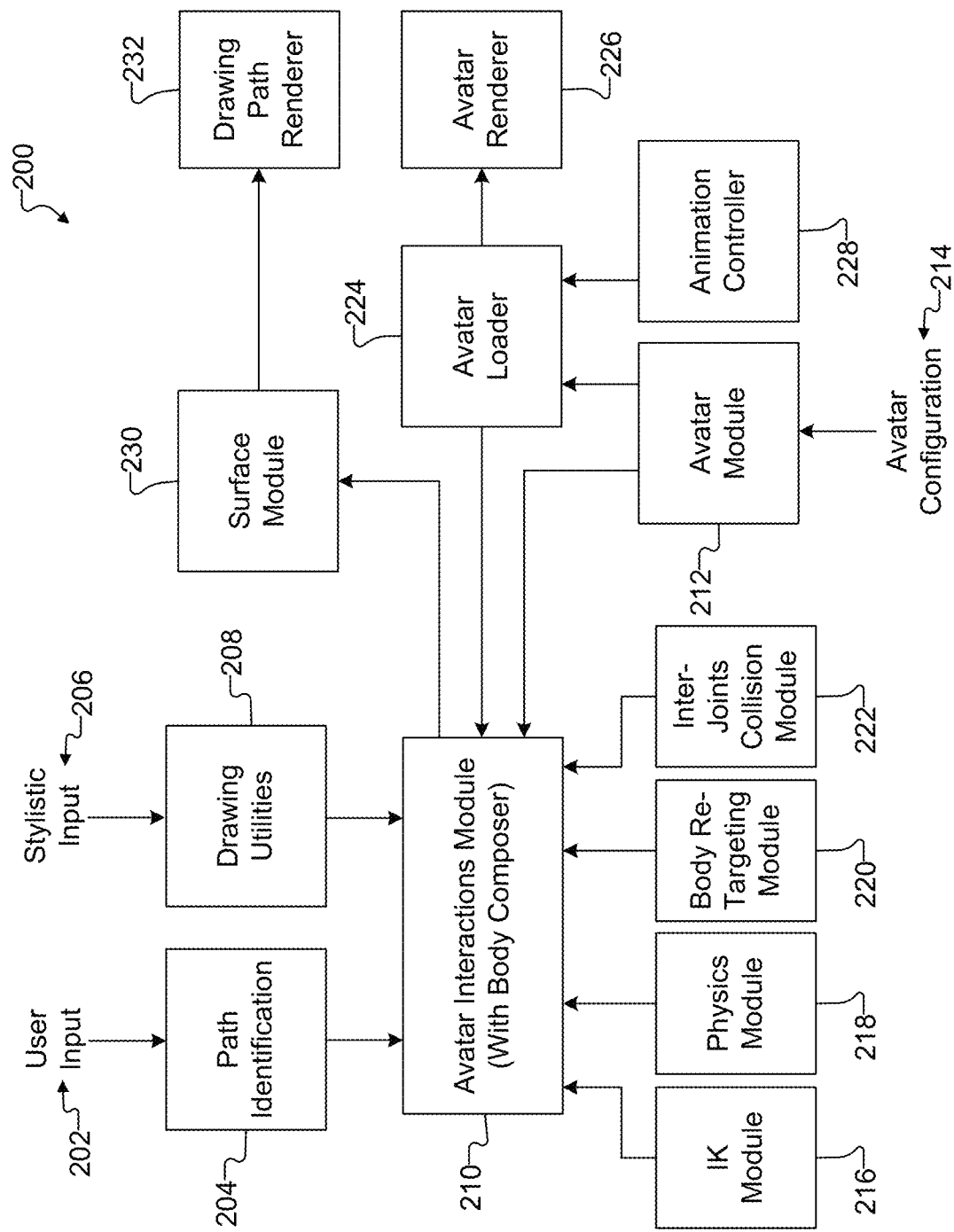
FIG. 2 illustrates an example architecture for mimicking user handwriting or other user input using an avatar in accordance with this disclosure.

FIG. 2 illustrates an example architecture 200 for mimicking user handwriting or other user input using an avatar in accordance with this disclosure. For ease of explanation, the architecture 200 is described as being used in the network configuration 100 to support the exchange of information between two electronic devices (such as two instances of the electronic device 101). However, the architecture 200 may be used with any other suitable devices and in any other suitable systems.

The architecture 200 is generally used to receive user input at a first electronic device (such as one instance of the electronic device 101) and to cause an avatar to draw the user input on the display screen of a second electronic device (such as another instance of the electronic device 101). The avatar that is displayed by the second electronic device may be an avatar as defined by or otherwise associated with the user of the first electronic device, an avatar as defined by or otherwise associated with the user of the second electronic device, or an avatar as defined in any other suitable manner. Also, the information that is exchanged between the first and second electronic devices may be exchanged directly or via at least one intermediate device, such as the server 106. In addition, the information that is exchanged between the first and second electronic devices may take various forms depending on the implementation. For instance, in some cases, the first electronic device could process user input, determine how to cause an avatar to move in order to draw the user input, and provide information defining how the avatar should move in order to draw the user input to the second electronic device. In other cases, the first electronic device could receive the user input and provide the user input to the second electronic device, and the second electronic device could determine how to cause an avatar to move and then display those movements. In still other cases, the first electronic device or a server or other intermediate device could generate a media file (such as an MPEG-4 or other file) that contains an avatar moving and drawing the user input, and the media file could be provided to the second electronic device for playback. In general, this disclosure is not limited to any specific division of functions among electronic devices or any specific types of information that are exchanged among the electronic devices.

As shown in FIG. 2, the architecture 200 generally receives and processes different types of inputs. For example, one type of input includes user input 202, which generally represents information provided by a user. The user input 202 is used to define the text, drawing(s), or other content that will be graphically drawn using an avatar. For instance, the user input 202 may represent touch-based input provided by a user, such as touch-based input drawn by the user on the display 160 of a first electronic device 101. The user input 202 may also or alternatively represent text-based, voice-based, or other input defining the content that will be drawn using an avatar. As particular examples, the user input 202 may include one or more of the following types of information: input provided by a stylus, a user's finger, or other object on a touch-sensitive display; a text message; a voice message converted into text; a mathematical function; or a user selection (such as via a voice input) of at least one pre-programmed parameterized item (such as "draw a flower with red petals" or "draw a sine wave with a period of two").

The user input 202 is provided to a path identification function 204, which generally operates to identify the path or paths that an avatar will use when drawing the user input. For example, when the user input 202 includes input provided by a stylus, a user's finger, or other object on a touch-sensitive display, the path identification function 204 could identify the path or paths taken by the stylus, user's finger, or other object on the touch-sensitive display. When the user input 202 includes a text message or a voice message converted into text, the path identification function 204 could identify the path or paths needed to draw the letters in the text. When the user input 202 includes a mathematical function, the path identification function 204 could identify a graph of the mathematical function. When the user input 202 includes a user selection of at least one pre-programmed parameterized item, the path identification function 204 could identify the path or paths needed to draw the pre-programmed item based on one or more user-provided parameters. The path identification function 204 can also derive one or more characteristics associated with the identified path(s), such as when the path identification function 204 measures the speed at which the user input 202 is provided. As a particular example, the path identification function 204 could identify the speed(s) at which a user draws each portion of the user input 202, which may allow an avatar to draw the user input 202 using the same or similar speed(s). Note that the path or paths associated with the user input 202 may be referred to collectively as a "draw path."

Another type of input for the architecture 200 includes stylistic input 206, which generally represents information defining the style to be used when an avatar draws the user input 202. For example, the stylistic input 206 may define at least one of the color(s), brush size(s) (along known as brush width(s)), and brush texture(s) to be used when an avatar draws the user input 202. The stylistic input 206 can be obtained from any suitable source or sources. For instance, if a user draws the user input 202, the user may select the specific color or colors to be used when drawing the user input 202, the specific brush size or sizes to be used when drawing the user input 202, or the specific brush texture or textures to be used when drawing the user input 202. The stylistic input 206 may also be based on user-defined preferences or other user-defined parameters, such as a default color, brush size, or brush texture. The stylistic input 206 is provided to a drawing utilities function 208, which generally operates to identify the characteristics to be used when an avatar draws the user input 202. For instance, the drawing utilities function 208 may identify the specific color, the specific brush size, or the specific brush texture associated with each segment or other portion of the user input 202. Note that any other or additional characteristics may be identified here, such as opacity.

In some embodiments, the outputs of the path identification function 204 and the drawing utilities function 208 can be expressed as or form structured data. For example, the path identification function 204 may identify each path associated with the user input 202 as including one or more straight line segments or curved segments. The structured data can therefore identify each segment, such as x-y coordinates associated with each segment. The structured data can also identify information associated with each segment, such as the color, width, texture, opacity, or drawing speed for that segment. The structured data can be streamed, sent in batches, or otherwise provided to one or more other components of the architecture 200 for further processing.

In this example, the outputs of the path identification function 204 and the drawing utilities function 208 are provided to an avatar interactions module 210, which generally operates to determine how an avatar should move in order to give the appearance that the avatar is drawing the user input 202. The avatar interactions module 210 in this particular example also receives input from an avatar module 212. The avatar module 212 uses avatar configuration information 214 to create an inverse kinematics (IK) skeleton and to initialize parameters of the IK skeleton. For example, the avatar configuration information 214 may include information defining an avatar's skeletal structure, which may be expressed using biovision hierarchy (BVH) format or other format. In some cases, the BVH or other information can identify the desired starting and stopping poses for the avatar, which respectively refer to the pose of the avatar prior to drawing the user input 202 and the pose of the avatar after drawing the user input 202. The avatar configuration information 214 may also include an initial pose for an avatar, one or more constraints on one or more joints of the avatar's skeletal structure, and a model of the avatar. The avatar module 212 here can use this information to define the overall structure of an avatar to be used to draw the user input 202.

The avatar interactions module 210 in this particular example further receives input from an IK module 216, a physics module 218, a body retargeting module 220, an inter-joints collision module 222, and an avatar loader 224. The IK module 216 is generally used to generate joint positions for the avatar's skeletal structure, where the joint positions will be used to move the avatar when drawing the user input 202. In some cases, full-body inverse kinematics can be used to adjust the body pose of an avatar for each frame of an animation based on the content to be drawn by the avatar. Also, in some embodiments, the IK module 216 can be configured to solve problems with multiple targets, such as by identifying the motion of an arm end effector needed to follow an identified path while leg end effectors are fixed at their desired positions on the floor. In addition, in some embodiments, each bone of an avatar's skeletal structure can be constrained to a restricted subset of motions in order to support more realistic movements, and a position-based IK skeletal structure can be converted into a rotational-based BVH structure or other rotational-based structure by the IK module 216.

The physics module 218 generally operates to simulate physical forces that can act on an avatar. For example, the physics module 218 may simulate how mass or gravity might act on an avatar when the avatar is moving. The body retargeting module 220 generally operates to apply generated paths to a skeletal structure in order to reorient different portions of an avatar's body. The inter-joints collision module 222 generally operates to perform collision detection and avoidance in order to prevent one portion of an avatar from colliding with (and possibly passing through) another portion of the avatar. This can help to prevent the avatar from having an unnatural interposition of its limbs or other portions during movement. The avatar loader 224 generally operates to read an avatar model from a suitable file and provide the avatar model to other components of the architecture 200.

Figure 3:
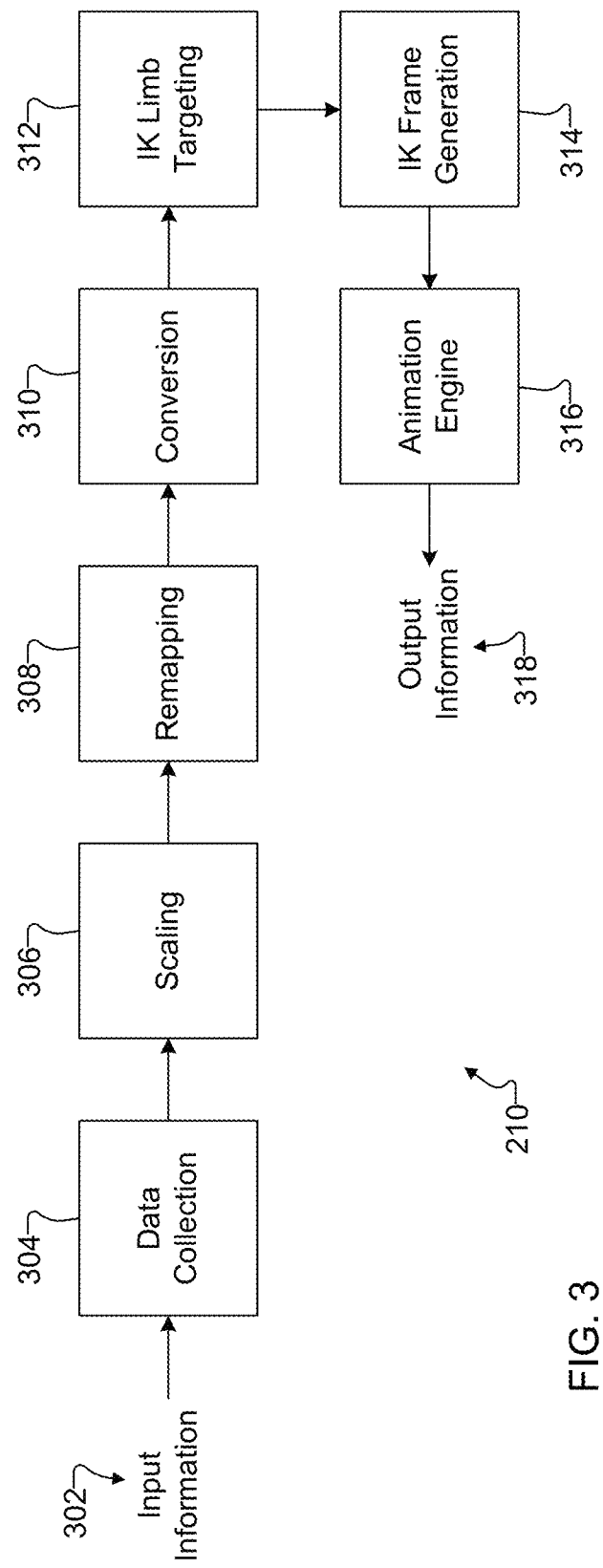
FIG. 3 illustrates an example avatar interactions module in the architecture of FIG. 2 in accordance with this disclosure.

The avatar interactions module 210 uses the various inputs from other components of the architecture 200 in order to determine how a specific avatar should move in order to give the appearance that the avatar is drawing the user inputs 202, where these movements are subject to the various constraints and requirements identified or enforced by the IK module 216, physics module 218, body retargeting module 220, and inter-joints collision module 222. For example, the avatar interactions module 210 can determine how an avatar should move one or more of its limbs in order to make it appear as if the avatar is drawing specific content on the display of an electronic device. One example implementation of the avatar interactions module 210 is shown in FIG. 3, which is described below. Note that the path or paths defining how an avatar should move in order to give the appearance of drawing content may again be referred to collectively as a "draw path." Ideally, the draw path identified for the avatar will be identical or similar to the draw path defined by the user input 202.

To display an avatar that draws the user input 202, information defining the appearance of the avatar is provided to an avatar renderer 226, which can generate graphics including the avatar for presentation on the display screen of an electronic device. For example, the avatar renderer 226 can generate an avatar having one or more of a specified hair color, a specified skin color, a specified eye color, specified clothing, a specified pose, or other characteristics. An animation controller 228 can also create animations in the displayed avatar, such as by creating animations associated with the avatar waiting for a response from a user. Outputs from the avatar interactions module 210 are used by the avatar renderer 226 to cause one or more portions of the displayed avatar to move, which gives the appearance that the avatar is drawing the user input 202. For instance, the avatar renderer 226 may cause one of the avatar's arms to move so that it appears as if the avatar is drawing the user input 202 with the avatar's hand.

Outputs from the avatar interactions module 210 are also provided to a surface module 230, which generally operates to define the virtual surface or space in or on which the displayed avatar appears to draw the user input 202. For example, the surface module 230 can identify a virtual surface in front of or behind the displayed avatar, where the displayed avatar is controlled in order to draw the user input 202 on that virtual surface. The specific virtual surface or space that is selected can vary based on the application. In some cases, for instance, an avatar may be displayed facing a user, and the virtual surface or space can be in front of the avatar between the avatar and the user. In other cases, an avatar may be displayed facing away from a user, and the avatar can be positioned between the virtual surface or space and the user. In still other cases, the virtual surface or space may be positioned elsewhere.

A drawing path renderer 232 uses the virtual surface or space identified by the surface module 230 and the identified path(s) associated with the user input 202 in order to draw the user input 202 on the virtual surface or in the virtual space. For example, the drawing path renderer 232 can cause line segments, curved segments, or other content to appear on the virtual surface or in the virtual space. The appearance of this content can be synchronized in time and position with the movements of the avatar, which creates the appearance that the avatar is drawing the user input 202 on the virtual surface or in the virtual space. The drawing path renderer 232 can also use various characteristics based on the user input 202 or the stylistic input 206 when drawing the content, such as by using the identified color(s), brush size(s), and brush texture(s) and by creating the content at the same or similar speed at which the content was drawn by the first user.

In this way, the architecture 200 can be used to capture user input or information associated with the user input using one electronic device and to cause an avatar to draw the user input on the display screen of another electronic device. Moreover, the movements or other actions of the avatar can be generated in a more realistic manner so that the overall result is more pleasing to users.

Note that there are a number of customizable features that can be used with the architecture 200. For example, users may be able to customize the appearances of their avatars, so the architecture 200 can be used with avatars having a wide variety of appearances. Also, users may be given the option of choosing the joint or other body part of an avatar that is used to draw content on the display screens of the users' devices. For instance, users may be given the option of selecting whether an avatar uses a right or left hand, right or left elbow, right or left foot, right or left knee, or right or left toes to draw content. The architecture 200 can therefore be configured to identify the selected portion of an avatar and to use the selected portion of the avatar when determining how the avatar should move in order to draw the content. Further, a user may be given the option of modifying constraints on one or more joints of an avatar's skeletal structure used by the IK module 216, which may allow the architecture 200 to create personalized animations for individual users' avatars. In addition, as described above, it is possible for an avatar to draw the user input 202 at the same speed(s) that a user originally draws the user input 202. However, in other cases, an avatar may draw the user input 202 at a constant or smooth speed, which some users might prefer. Thus, users may be given the option of using either an original speed or a smooth speed. Finally, while it may often be assumed that avatars take the appearance of people, avatars having other forms (such as animal forms) can be used here. Of course, any other or additional aspects of the architecture 200 could be customized by users. Also note that avatars can be used for any number of user interactions, so an avatar might be used to draw content and to engage in other interactions. As a result, it is possible for the drawing actions of an avatar to be blended and used with other animations of the avatar, such as pre-generated animations.

The functions shown in or described with respect to FIG. 2 can be implemented in an electronic device 101, server 106, or other device in any suitable manner. For example, in some embodiments, at least some of the functions shown in or described with respect to FIG. 2 can be implemented or supported using one or more software applications or other software instructions that are executed by the processor 120 of the electronic device 101, server 106, or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of an architecture 200 for mimicking user handwriting or other user input using an avatar, various changes may be made to FIG. 2. For example, various functions shown in FIG. 2 may be combined, further subdivided, replicated, omitted, or rearranged and additional functions may be added according to particular needs. Also, while the architecture 200 here is shown as being an integrated architecture, it will typically be possible for different functions of the architecture 200 to be performed using different devices, and the division of the functions between the devices can vary based on the implementation. For instance, in some cases, a first electronic device may perform all of the functions shown in FIG. 2 in order to produce a media file that can be sent to and played by a second electronic device. In other cases, a first electronic device may perform some functions shown in FIG. 2, and resulting information can be provided to a second electronic device that performs other functions shown in FIG. 2. In still other cases, a server 106 or other intermediate device(s) may be used to perform some of the functions shown in FIG. 2. In general, this disclosure is not limited to any particular physical or logical implementation of the architecture 200.

FIG. 3 illustrates an example avatar interactions module 210 in the architecture 200 of FIG. 2 in accordance with this disclosure. As shown in FIG. 3, the avatar interactions module 210 receives various input information 302, which can include information from the path identification function 204 and the drawing utilities function 208. The avatar interactions module 210 includes a data collection function 304, which generally operates to collect specified information for further processing. For example, the data collection function 304 can collect information defining segments of one or more paths contained in the user input 202 and any characteristics of the segments (such as color, width, texture, opacity, or drawing speed). In some embodiments, the information defining the segments of the one or more paths can include coordinates defining each segment, such as x-y coordinates of a starting point and x-y coordinates of an ending point for each segment of the path(s). Of course, other coordinate systems for defining the two-dimensional coordinates of the segments of the one or more paths may be used here. As noted above, this information can be streamed, sent in batches, or otherwise provided to the avatar interactions module 210.

A scaling function 306 is used to normalize at least some of the collected information. For example, the scaling function 306 can scale horizontal and vertical components of the two-dimensional coordinates defining the segments of the one or more paths contained in the user input 202 (such as by scaling the x coordinates and the y coordinates of the segments). The scaling that is performed here can be done in order to scale the segments of the one or more paths contained in the user input 202 (which may be said to be associated with a "drawing space" in some cases) into suitable segments for drawing by an avatar (which are said to be associated with an "avatar space"). The drawing space generally defines the space in which a user can draw the user input 202, while the avatar space generally defines the space in which an avatar can draw the user input 202. The drawing space and the avatar space may or may not be identical due to a number of factors. For instance, the screen size of the device that receives the user input 202 may be different from the screen size of the device that displays the avatar. Also, the height or width of the avatar or the reach of the avatar's limbs may be customizable or variable, and one or more of these factors may prevent the avatar from drawing in all available space. As a result, the coordinates of the segments forming the one or more paths contained in the user input 202 (which represent a "draw path") can be scaled, and the scaled segments (which now represent another "draw path") can be used in the avatar space. In some cases, x and y components of each coordinate of the draw path defined by the user input 202 can be respectively scaled according to the ratios of the widths and heights of the avatar space and the drawing space.

A remapping function 308 maps the scaled coordinates of the segments defining the one or more paths contained in the user input 202 into a different coordinate system. For example, the remapping function 308 can remap coordinates from the drawing space associated with the user input 202 into two-dimensional or three-dimensional coordinates within the avatar space. The remapping can be performed for various reasons, such as to fit the segments to be followed by the avatar into a suitable space of a display screen (referred to as frame fitting). The remapping can also be performed to support drawing speed adjustments, such as when drawing coordinates for consecutive frames containing the avatar are placed closer together for slowing drawing speeds or farther apart for faster drawing speeds. In addition, the remapping can be performed to flip the rendering surfaces associated with the user input 202 and the avatar. As a particular example of this, when a first user draws on the display screen of a first electronic device and an avatar draws the same content while facing a second user of a second electronic device, the rendering surface of the avatar can be flipped horizontally compared to the rendering surface of the first user. This is because the first user may draw left to right or right to left (depending on the language), but the avatar would appear to draw the same content backwards and in the opposite direction when facing the second user (from the perspective of the avatar) unless correction is made. The remapping function 308 can therefore flip the rendering surface associated with the avatar relative to the rendering surface associated with the user input 202, which causes the rendering surface associated with the avatar to be a mirror image of the rendering surface associated with the user input 202. This allows the content drawn by the avatar facing the second user to look correct from the perspective of the second user.

A conversion function 310 is applied to the remapped coordinates of the segments in order to project the segments into the three-dimensional space around the avatar. For example, the remapped coordinates of the segments can be mapped onto one or more flat planes (such as a horizontal, vertical, or sloped plane) around the avatar, or the remapped coordinates of the segments can be mapped onto one or more spherical or other curved surfaces around the avatar. This essentially identifies the coordinates in three-dimensional space around the avatar where the avatar's limb will be moved in order to make it appear as if the avatar is drawing the user input 202.

An IK limb targeting function 312 is used to apply the coordinates to a specific limb of the avatar, and an IK frame generation function 314 generates individual image frames showing the avatar with its limb in different positions based on the applied coordinates. For example, the IK limb targeting function 312 can apply the coordinates to a particular joint of interest for the avatar based on inverse kinematics. As particular examples, the IK limb targeting function 312 can cause the avatar's right or left hand, right or left elbow, right or left foot, right or left knee, or right or left toes to appear at different ones of the coordinates over time. The IK frame generation function 314 can generate image frames of the avatar's right or left hand, right or left elbow, right or left foot, right or left knee, or right or left toes at those coordinates over time. By generating multiple image frames over time, this causes the avatar's joint to move over time (ideally in coordination with the drawing to be performed). Overall, this applies the identified coordinates to the skeletal structure of the avatar based on inverse kinematics in order to create the drawing motions of the avatar.

An animation engine 316 processes the generated image frames produced by the IK frame generation function 314 in order to animate the avatar. For example, the animation engine 316 can generate additional image frames (in between each consecutive pair of image frames produced by the IK frame generation function 314) in order to animate movements of the avatar. This allows the avatar to be rendered on a display screen along with movements that are synchronized with the creation of the user input 202 on the display screen, thereby giving the appearance that the avatar is drawing the content on the display screen. The animation engine 316 can output information 318 (such as images frames) associated with the animated avatar, which allows other components of the architecture 200 to render the avatar with the animated movements.

Although FIG. 3 illustrates one example of an avatar interactions module 210 in the architecture 200 of FIG. 2, various changes may be made to FIG. 3. For example, various functions shown in FIG. 3 may be combined, further subdivided, replicated, omitted, or rearranged and additional functions may be added according to particular needs. Also, various functions shown as residing within or being performed by the avatar interactions module 210 may be performed by other components in the architecture 200.

Figure 4:
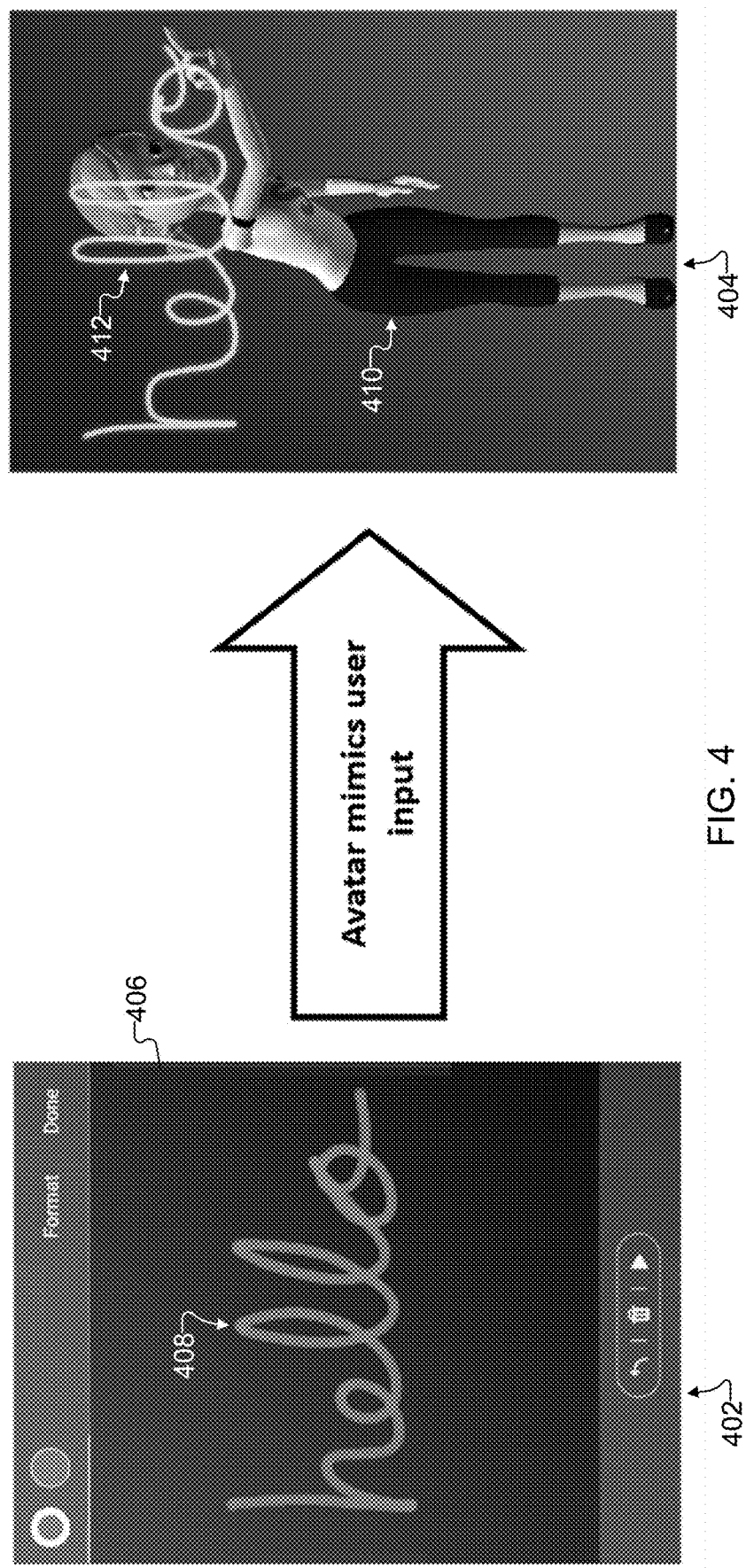
FIG. 4 illustrates a first example usage of an avatar that mimics user handwriting or other user input in accordance with this disclosure.

FIG. 4 illustrates a first example usage of an avatar that mimics user handwriting or other user input in accordance with this disclosure. For ease of explanation, the example usage shown in FIG. 4 is described as being performed using the architecture 200 of FIGS. 2 and 3 within the network configuration 100 of FIG. 1. However, the same or similar type of functionality may be performed using any other suitable device(s) and in any other suitable system(s).

As shown in FIG. 4, the first example usage of an avatar involves the use of two electronic devices 402 and 404, such as two instances of the electronic device 101 from FIG. 1. In this example, the electronic devices 402 and 404 take the form of smartphones or tablet computers. The first electronic device 402 is configured to receive user input, such as user input 202. In this example, the first electronic device 402 is configured to receive the user input using touch-based input in a drawing area 406, which represents an area of the display screen of the first electronic device 402 that is configured to receive touch-based user input (such as via the user's finger, a stylus, or other object). In this particular example, a first user of the first electronic device 402 has drawn first content 408 in the form of handwritten content. The first electronic device 402 can capture information defining the first content 408, such as line segments or other segments that define the draw path associated with the first content 408.

The architecture 200 uses this information to cause an avatar 410 presented on the display screen of the second electronic device 404 to draw the same user input. In this example, the avatar 410 uses a finger to draw second content 412 on the display screen of the second electronic device 404. The second content 412 can represent the same information as the first content 408, where the avatar 410 moves a limb along another draw path on the display screen of the second electronic device 404. However, as described above, the second content 412 can be created based on normalizing the coordinates associated with the draw path used to define the first content 408, where the normalization is (among other things) based on dimensions of the avatar 410 within the avatar's associated avatar space, to create the draw path for the avatar 410. These dimensions of the avatar 410 may include the height or width of the avatar 410 or the reach of at least one of the avatar's limbs (such as the limb used to draw the second content 412).

An example of the flipping of the rendering surfaces can also be seen here in this example. For the first electronic device 402, the rendering surface faces the user, and the user in this example may write left-to-right when writing words or sentences. For the second electronic device 404, the rendering surface is flipped horizontally, causing the avatar 410 to draw the content from right-to-left (from the perspective of the avatar 410). If the rendering surface used at the second electronic device 404 is not flipped, the avatar would draw left-to-right from the perspective of the avatar 410, but this would be right-to-left from the perspective of the user of the second electronic device 404. This would cause the second content 412 to be reversed or backwards from the perspective of the second user of the second electronic device 404. By flipping the rendering surface, the avatar 410 draws the second content 412 in a form that is readable by the user of the second electronic device 404.

Figure 5:
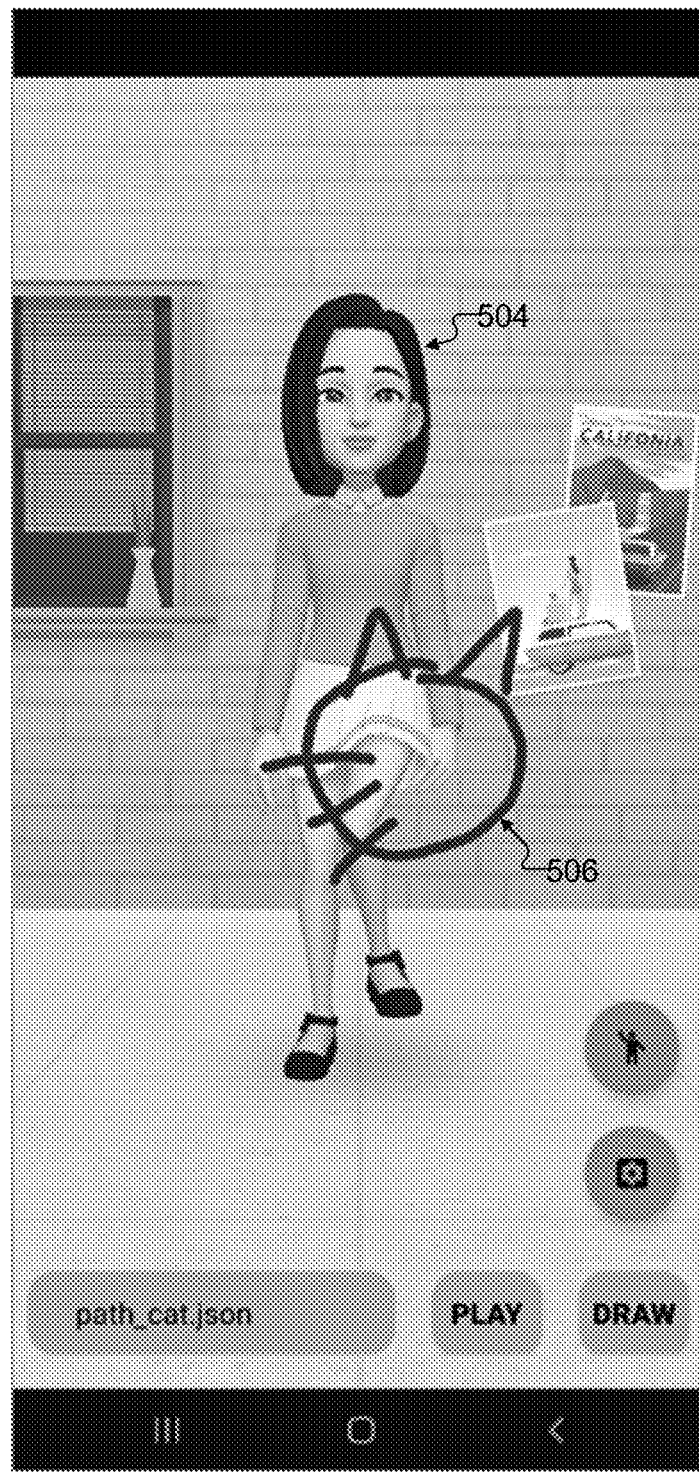
FIG. 5 illustrates a second example usage of an avatar that mimics user handwriting or other user input in accordance with this disclosure.

FIG. 5 illustrates a second example usage of an avatar that mimics user handwriting or other user input in accordance with this disclosure. For ease of explanation, the example usage shown in FIG. 5 is described as being performed using the architecture 200 of FIGS. 2 and 3 within the network configuration 100 of FIG. 1. However, the same or similar type of functionality may be performed using any other suitable device(s) and in any other suitable system(s).

As shown in FIG. 5, the second example usage illustrates how an electronic device 502, which may represent an instance of the electronic device 101 from FIG. 1, can present an avatar 504 that uses a different limb to draw content 506. While the avatar 410 in FIG. 4 uses its finger to draw the second content 412, the avatar 504 in FIG. 5 uses its knee to draw the content 506. Note that an avatar may use any other suitable limb to draw content on a display screen, or an avatar may appear to hold or otherwise manipulate an object that draws content on a display screen, such as a prosthetic hand or artificial limb. This type of functionality may, in some cases, be used to promote inclusion for people with disabilities.

Figure 6A:
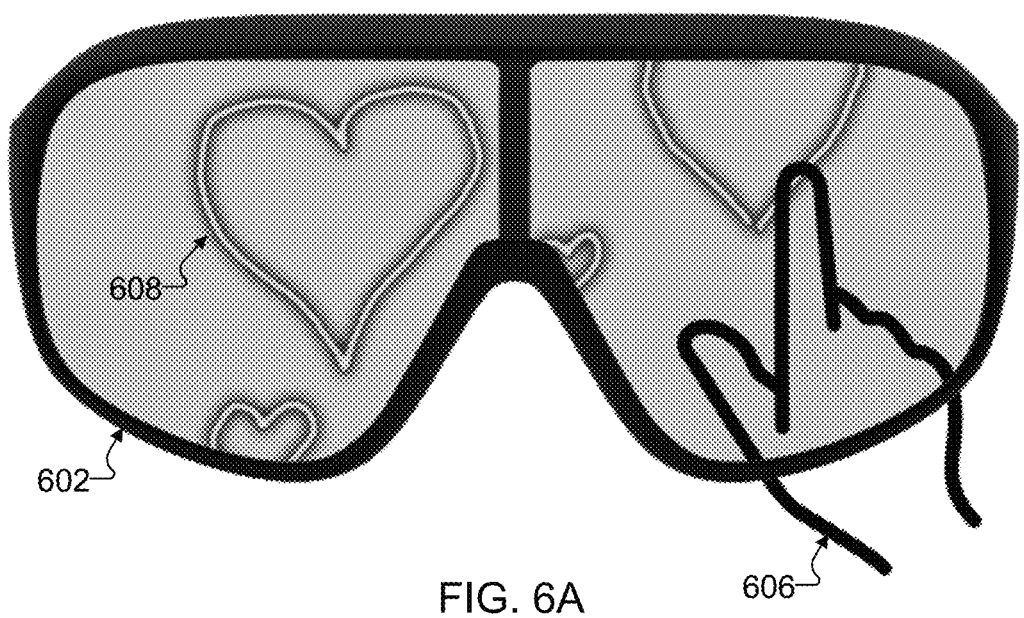
FIGS. 6A and 6B illustrate a third example usage of an avatar that mimics user handwriting or other user input in accordance with this disclosure.
Figure 6B:
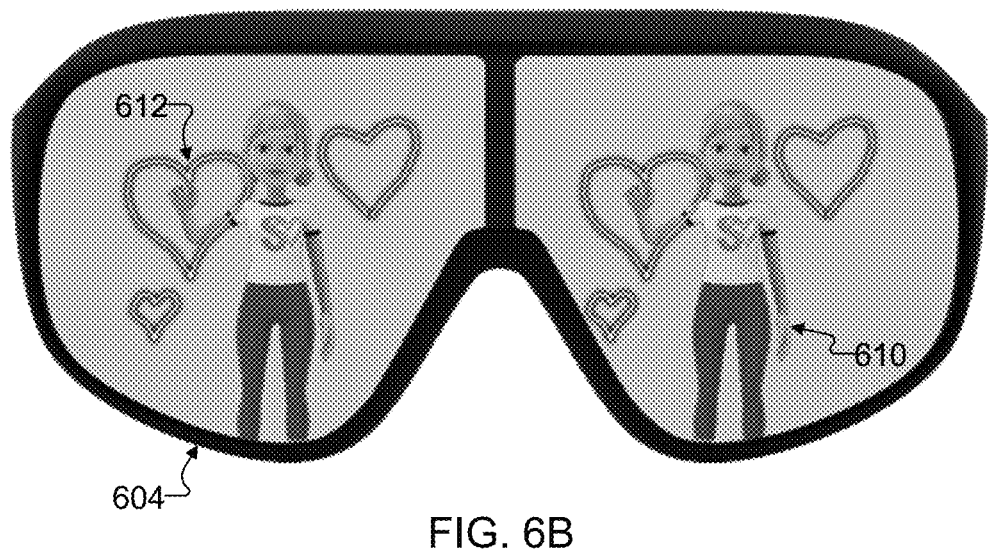

FIGS. 6A and 6B illustrate a third example usage of an avatar that mimics user handwriting or other user input in accordance with this disclosure. For ease of explanation, the example usage shown in FIGS. 6A and 6B is described as being performed using the architecture 200 of FIGS. 2 and 3 within the network configuration 100 of FIG. 1. However, the same or similar type of functionality may be performed using any other suitable device(s) and in any other suitable system(s).

As shown in FIG. 6, the third example usage of an avatar involves the use of two electronic devices 602 and 604, such as two instances of the electronic device 101 from FIG. 1. In this example, the electronic devices 602 and 604 take the form of virtual reality (VR) or augmented reality (AR) headsets. The first electronic device 602 is configured to receive user input, such as user input 202. In this example, the first electronic device 602 is configured to receive the user input by sensing movement of an object (such as a user's hand 606) within the field of view of the first electronic device 602. In this particular example, a first user of the first electronic device 602 can use his or her hand, handheld device, or other object to draw first content 608 in the form of handwritten images. The first electronic device 602 can capture information defining the first content 608, such as line segments or other segments that define the draw path associated with the first content 608.

The architecture 200 uses this information to cause at least one instance of an avatar 610 presented on the second electronic device 604 to draw the same user input. In this example, the avatar 610 uses its finger to draw second content 612 within the field of view of the second electronic device 604, although other limbs or objects may be used to draw the second content 612. The second content 612 can represent the same information as the first content 608, where the avatar 610 moves a limb or object along another draw path within the field of view of the second electronic device 604. However, as described above, the second content 612 can be created based on normalizing the coordinates associated with the draw path used to define the first content 608, where the normalization is (among other things) based on dimensions of the avatar 610 within the avatar's associated avatar space, to create the draw path for the avatar 610. These dimensions of the avatar 610 may include the height or width of the avatar 610 or the reach of at least one of the avatar's limbs (such as the limb used to draw the second content 612).

Note that, in the example shown in FIG. 6B, two instances of the avatar 610 are shown as drawing two instances of the second content 612, namely one instance of each per eye. However, this is for illustration only, and other usages of the avatar 610 may occur. For example, the second electronic device 604 may be configured to operate so that (from the perspective of the user wearing the second electronic device 604) a single instance of the avatar 610 is seen and draws a single instance of the second content 612.

The example usages shown in FIGS. 4, 5, 6A, and 6B may have a variety of applications. For example, in some embodiments, avatars may be used as shown here to support virtual classroom experiences. As a particular example, an avatar may be used to represent a professor, teacher, or other educator, and the avatar may be used to draw content on a whiteboard or other virtual object or surface displayed behind the avatar or on a transparent or other virtual surface in front of the avatar. Users viewing the avatar may represent students who are being taught by the educator represented by the avatar. This can give the appearance of the educator writing on a classroom whiteboard. Note, however, that the described approaches may be used in any other suitable applications.

Although FIGS. 4 through 6B illustrate example usages of avatars that mimic user handwriting or other user input, various changes may be made to FIGS. 4 through 6B. For example, the actual user inputs received from users and the actual mimicked user inputs drawn by avatars can vary widely. Also, the specific appearances of the avatars and the characteristics of the content drawn by the avatars can vary widely.

Figure 7:
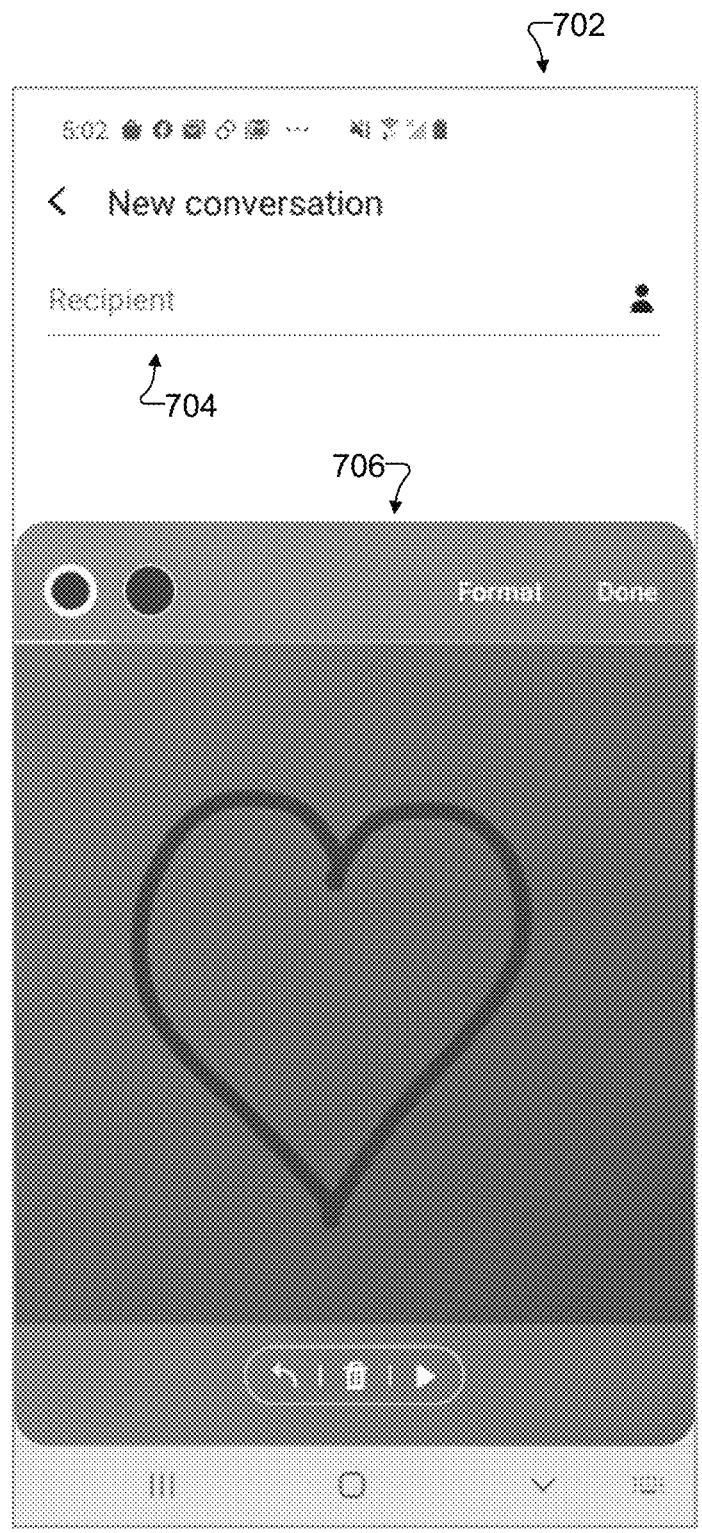
FIG. 7 illustrates an example input mechanism for providing user input to be mimicked by an avatar in accordance with this disclosure.

FIG. 7 illustrates an example input mechanism for providing user input to be mimicked by an avatar in accordance with this disclosure. For ease of explanation, the example input mechanism shown in FIG. 7 is described as being used to support the architecture 200 of FIGS. 2 and 3 within the network configuration 100 of FIG. 1. However, the same or similar type of functionality may be used with any other suitable device(s) and in any other suitable system(s).

As shown in FIG. 7, an electronic device 702, which may represent an instance of the electronic device 101 from FIG. 1, can support a texting or messaging function (such as via a suitable application or "app"). The electronic device 702 here allows a user to enter information into a region 704 of the texting or messaging function, such as by identifying the person or group to receive a text message or other message. The electronic device 702 also allows the user to enter graphical information or other user input 202 via a drawing region 706. The drawing region 706 can include an area where the user can provide touch-based input, as well as controls for adjusting the background color, line color, or other characteristics of or associated with the drawn content. Using the architecture 200, the content provided via the drawing region 706 can be sent to one or more other users, where one or more avatars displayed on the electronic device(s) associated with the other user(s) can draw the same content.

Although FIG. 7 illustrates one example of an input mechanism for providing user input to be mimicked by an avatar, various changes may be made to FIG. 7. For example, the drawing region 706 may be used with any other suitable application or app and is not limited to use with a texting or messaging function. Also, any other suitable mechanisms may be used to obtain graphical or non-graphical user input 202, such as other drawing mechanisms, a keyboard for receiving text that is converted into content drawn by an avatar, or a microphone for receiving a voice message that is converted into text and then into content drawn by an avatar. Content drawn by an avatar may also be automatically generated based on user input, such as based on an identification of a mathematical function or based on a user selection of at least one pre-programmed parameterized item.

Figure 8:
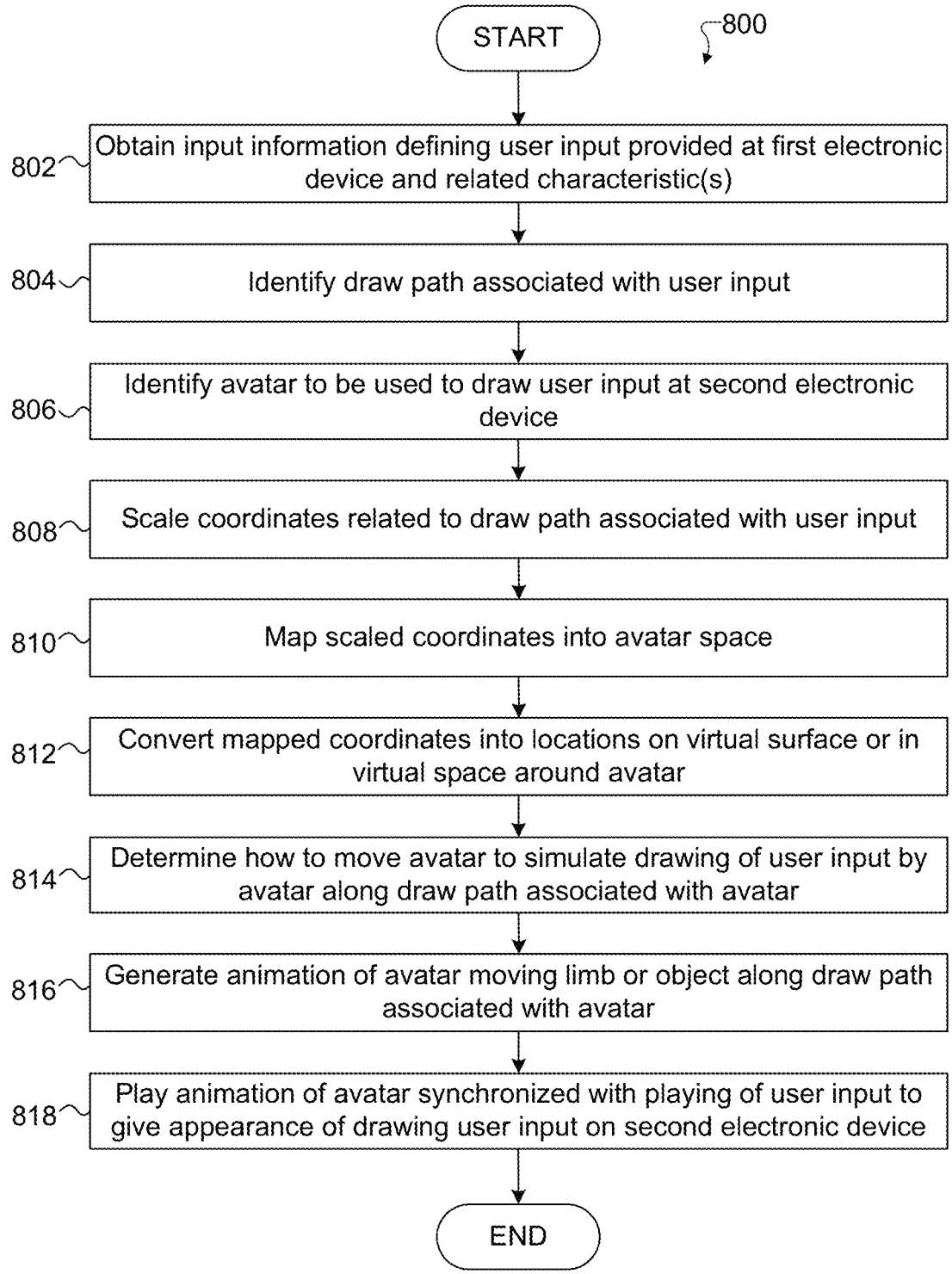
FIG. 8 illustrates an example method for mimicking user handwriting or other user input using an avatar in accordance with this disclosure.

FIG. 8 illustrates an example method 800 for mimicking user handwriting or other user input using an avatar in accordance with this disclosure. For ease of explanation, the method 800 is described as being performed using the architecture 200 of FIGS. 2 and 3 within the network configuration 100 of FIG. 1. However, the method 800 may be performed using any other suitable device(s) and in any other suitable system(s).

As shown in FIG. 8, input information defining user input provided at a first electronic device (and possibly one or more related characteristic) is obtained at step 802, and a draw path associated with the user input is identified at step 804. This may include, for example, the processor 120 of a first instance of the electronic device 101 or another electronic device obtaining user input 202. This may also include the processor 120 of the first electronic device or another electronic device using the path identification function 204 to identify segments of one or more paths associated with the user input 202 and the drawing utilities function 208 to identify one or more characteristics associated with the user input 202 (such as line color, line width, line texture, opacity, background color, or drawing speed).

An avatar to be used to draw the user input on the display screen of at least one second electronic device is identified at step 806. This may include, for example, the processor 120 of one of the electronic devices 101 or another electronic device identifying an avatar associated with a user of the first electronic device. As a particular example, this may include the processor 120 of one of the electronic devices 101 or another electronic device loading a model of an avatar from a file, where the model defines features of the avatar (such as its skeletal structure and outward appearance).

Coordinates related to the draw path associated with the user input are scaled at step 808. This may include, for example, the processor 120 of one of the electronic devices 101 or another electronic device scaling horizontal and vertical components (such as x and y components) of two-dimensional coordinates of the segments in the draw path defined by the user input 202. The coordinates can be scaled based on various factors, such as the dimensions of the avatar in an avatar space (like the height/width of the avatar or the reach of the avatar's limb(s)). The scaled coordinates are mapped into the avatar space at step 810, and the mapped coordinates are converted into locations on a virtual surface or in a virtual space at step 812. This may include, for example, the processor 120 of one of the electronic devices 101 or another electronic device mapping the scaled coordinates of the draw path associated with the user input 202 (which may be within a drawing space associated with the user input 202) into two-dimensional or three-dimensional coordinates of another draw path associated with the avatar (which are within the avatar space). This may also include the processor 120 of one of the electronic devices 101 or another electronic device flipping the rendering surface associated with the avatar relative to the rendering surface associated with the user input 202 so that the rendering surface associated with the avatar is a mirror image of the rendering surface associated with the user input 202.

A determination is made how to move the avatar (or at least a portion thereof) in order to simulate drawing of the user input by the avatar along the draw path associated with the avatar at step 814. This may include, for example, the processor 120 of one of the electronic devices 101 or another electronic device determining how to move a selected limb or other portion of the avatar so that it appears the avatar is drawing on the virtual surface or in the virtual space. As a particular example, this may include the processor 120 of one of the electronic devices 101 or another electronic device applying inverse kinematics to the avatar's skeletal structure in order to determine how to move the avatar. This may also include the processor 120 of one of the electronic devices 101 or another electronic device simulating how physical forces (such as mass or gravity) act on the avatar. This may further include the processor 120 of one of the electronic devices 101 or another electronic device detecting and avoiding any collisions between joints or other portions of the avatar while the avatar is moving.

The avatar is animated so that a limb or object associated with the avatar moves along the draw path associated with the avatar at step 816. This may include, for example, the processor 120 of one of the electronic devices 101 or another electronic device generating image frames of the avatar with its limb or object in different locations and generating intermediate frames between those image frames. The animation of the avatar is played in synchronization with the playing of the user input in order to give the appearance of drawing the user input on the second electronic device at step 818. This may include, for example, the processor 120 of the second electronic device 101 displaying the avatar on the display screen of the second electronic device. This may also include the processor 120 of the second electronic device 101 playing the animation of the avatar while also creating the user input 202 on the display screen of the second electronic device. In some embodiments, the animation of the avatar is captured using a media file, and the second electronic device plays the media file. However, other implementations of the animation generation and playback may be used.

Although FIG. 8 illustrates one example of a method 800 for mimicking user handwriting or other user input using an avatar, various changes may be made to FIG. 8. For example, while shown as a series of steps, various steps in FIG. 8 may overlap, occur in parallel, occur in a different order, or occur any number of times. Also, any suitable division of operations may occur between the electronic devices that implement the method 800.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   obtaining input information defining a user input associated with a user of a first electronic device at a second electronic device;

presenting, on a display screen of the second electronic device, an avatar; and causing, using at least one processor of the second electronic device, the avatar on the display screen of the second electronic device to draw the user input on the display screen of the second electronic device;

wherein the avatar has associated dimensions within an avatar space; and wherein a first draw path used by the avatar to draw the user input is normalized based on the dimensions of the avatar within the avatar space.

2. The method of claim 1, wherein causing the avatar on the display screen of the second electronic device to draw the user input comprises flipping a rendering surface associated with the avatar relative to a rendering surface associated with the user input so that the rendering surface associated with the avatar is a mirror image of the rendering surface associated with the user input.

3. The method of claim 1, wherein causing the avatar on the display screen of the second electronic device to draw the user input comprises mapping two-dimensional coordinates of a second draw path within a drawing space associated with the user input into two-dimensional or three-dimensional coordinates of the first draw path within the avatar space.

4. The method of claim 3, wherein the first draw path is normalized by:
scaling horizontal and vertical components of the two-dimensional coordinates of the second draw path based on the dimensions of the avatar in the avatar space; and
applying the scaled horizontal and vertical components of the two-dimensional coordinates of the second draw path to a skeletal structure of the avatar based on inverse kinematics to produce the first draw path.

5. The method of claim 1, wherein causing the avatar on the display screen of the second electronic device to draw the user input comprises causing the avatar on the display screen of the second electronic device to draw the user input without having a movable joint of the avatar pass through another portion of the avatar.

6. The method of claim 1, wherein a portion of the avatar that draws the user input on the display screen of the second electronic device comprises a selectable joint of the avatar.

7. The method of claim 1, wherein causing the avatar on the display screen of the second electronic device to draw the user input comprises using a simulated skeletal structure of the avatar and simulated physical forces acting on the avatar to determine how the avatar moves on the display screen of the second electronic device.

8. The method of claim 1, wherein:
the input information identifies (i) multiple segments of a second draw path as defined by the user of the first electronic device as the user provides the user input and (ii) a speed at which the multiple segments of the second draw path are defined by the user of the first electronic device; and
causing the avatar on the display screen of the second electronic device to draw the user input comprises causing a portion of the avatar to follow the first draw path based on the identified segments of the second draw path and based on the identified speed.

9. The method of claim 1, wherein the input information comprises a media file that is playable by the second electronic device.

10. An apparatus comprising:
a display screen; and
at least one processing device configured to:

obtain input information defining a user input associated with a user of an electronic device;
initiate presentation of an avatar on the display screen; and
cause the avatar on the display screen to draw the user input on the display screen;
wherein the avatar has associated dimensions within an avatar space; and
wherein a first draw path used by the avatar to draw the user input is normalized based on the dimensions of the avatar within the avatar space.

11. The apparatus of claim 10, wherein the at least one processing device is configured to flip a rendering surface associated with the avatar relative to a rendering surface associated with the user input so that the rendering surface associated with the avatar is a mirror image of the rendering surface associated with the user input.

12. The apparatus of claim 10, wherein, to cause the avatar on the display screen to draw the user input, the at least one processing device is configured to map two-dimensional coordinates of a second draw path within a drawing space associated with the user input into two-dimensional or three-dimensional coordinates of the first draw path within the avatar space.

13. The apparatus of claim 12, wherein:
the at least one processing device is further configured to normalize the first draw path; and
to normalize the first draw path, the at least one processing device is configured to:
scale horizontal and vertical components of the two-dimensional coordinates of the second draw path based on the dimensions of the avatar in the avatar space; and
apply the scaled horizontal and vertical components of the two-dimensional coordinates of the second draw path to a skeletal structure of the avatar based on inverse kinematics to produce the first draw path.

14. The apparatus of claim 10, wherein the at least one processing device is configured to cause the avatar on the display screen to draw the user input without having a movable joint of the avatar pass through another portion of the avatar.

15. The apparatus of claim 10, wherein a portion of the avatar that draws the user input on the display screen comprises a selectable joint of the avatar.

16. The apparatus of claim 10, wherein the at least one processing device is configured to use a simulated skeletal structure of the avatar and simulated physical forces acting on the avatar to determine how the avatar moves on the display screen.

17. The apparatus of claim 10, wherein:
the input information identifies (i) multiple segments of a second draw path as defined by the user as the user provides the user input and (ii) a speed at which the multiple segments of the second draw path are defined by the user; and
to cause the avatar on the display screen to draw the user input, the at least one processing device is configured to cause a portion of the avatar to follow the first draw path based on the identified segments of the second draw path and based on the identified speed.

18. A non-transitory computer readable medium containing instructions that when executed cause at least one processor to:
obtain input information defining a user input associated with a user of an electronic device;
initiate presentation of an avatar on a display screen; and cause the avatar on the display screen to draw the user input on the display screen;
wherein the avatar has associated dimensions within an avatar space; and
wherein a first draw path used by the avatar to draw the user input is normalized based on the dimensions of the avatar within the avatar space.

19. The non-transitory computer readable medium of claim 18, wherein a rendering surface associated with the avatar is flipped relative to a rendering surface associated with the user input so that the rendering surface associated with the avatar is a mirror image of the rendering surface associated with the user input.

20. The non-transitory computer readable medium of claim 18, wherein the instructions that when executed cause the at least one processor to cause the avatar on the display screen to draw the user input comprise:
instructions that when executed cause the at least one processor to map two-dimensional coordinates of a second draw path within a drawing space associated with the user input into two-dimensional or three-dimensional coordinates of the first draw path within the avatar space.

21. A method comprising:
obtaining, using at least one processor of a first electronic device, first information defining a user input from a user of the first electronic device;
determining, using the at least one processor of the first electronic device, how to cause an avatar to move based on the first information; and
transmitting, to a second electronic device, second information defining movements of the avatar that, when displayed on the second electronic device, cause the avatar to draw the user input on a display screen of the second electronic device;
wherein the avatar has associated dimensions within an avatar space; and
wherein the second information defines the movements of the avatar as following a first draw path, the first draw path normalized based on the dimensions of the avatar within the avatar space.

22. The method of claim 21, wherein a rendering surface associated with the avatar is flipped relative to a rendering surface associated with the user input so that the rendering surface associated with the avatar is a mirror image of the rendering surface associated with the user input.

23. The method of claim 21, wherein the second information is generated by mapping two-dimensional coordinates of a second draw path within a drawing space associated with the user input into two-dimensional or three-dimensional coordinates of the first draw path within the avatar space.

24. The method of claim 23, wherein the first draw path is normalized by:
scaling horizontal and vertical components of the two-dimensional coordinates of the second draw path based on the dimensions of the avatar in the avatar space; and
applying the scaled horizontal and vertical components of the two-dimensional coordinates of the second draw path to a skeletal structure of the avatar based on inverse kinematics to produce the first draw path.

25. The method of claim 21, wherein the movements of the avatar are determined such that a movable joint of the avatar moves without passing through another portion of the avatar.

26. The method of claim 21, wherein the second information defines the movements of the avatar such that a portion of the avatar that draws the user input on the display screen of the second electronic device represents a selectable joint of the avatar.

27. The method of claim 21, wherein the second information is generated by using a simulated skeletal structure of the avatar and simulated physical forces acting on the avatar to determine how the avatar moves on the display screen of the second electronic device.

28. The method of claim 21, wherein:
the first information identifies (i) multiple segments of a second draw path as defined by the user of the first electronic device as the user provides the user input and (ii) a speed at which the multiple segments of the second draw path are defined by the user of the first electronic device; and
the second information defines the movements of the avatar such that a portion of the avatar follows the first draw path based on the identified segments of the second draw path and based on the identified speed.

29. The method of claim 21, wherein the second information comprises a media file that is playable by the second electronic device.

* * * * *